US007873668B2

(12) United States Patent
Carlson et al.

(10) Patent No.: US 7,873,668 B2
(45) Date of Patent: Jan. 18, 2011

(54) APPLICATION DATA BINDING

(75) Inventors: Max D. Carlson, San Francisco, CA (US); Oliver W. Steele, Brookline, MA (US); Adam G. Wolff, San Francisco, CA (US)

(73) Assignee: Laszlo Systems, Inc., San Francisco, CA (US)

( * ) Notice: Subject to any disclaimer, the term of this patent is extended or adjusted under 35 U.S.C. 154(b) by 623 days.

(21) Appl. No.: 10/642,115

(22) Filed: Aug. 15, 2003

(65) Prior Publication Data

US 2005/0038796 A1 Feb. 17, 2005

(51) Int. Cl.
*G06F 7/00* (2006.01)
*G06F 17/30* (2006.01)

(52) U.S. Cl. ....................... 707/795; 707/796; 707/804; 707/805; 715/234; 715/760

(58) Field of Classification Search ................ 707/100, 707/103 R; 709/218
See application file for complete search history.

(56) References Cited

U.S. PATENT DOCUMENTS

| | | | | |
|---|---|---|---|---|
| 5,987,256 | A * | 11/1999 | Wu et al. | 717/146 |
| 6,941,521 | B2 * | 9/2005 | Lin et al. | 715/762 |
| 6,957,392 | B2 * | 10/2005 | Simister et al. | 715/746 |
| 6,973,460 | B1 * | 12/2005 | Mitra | 707/103 R |
| 7,146,350 | B2 * | 12/2006 | Holland et al. | 706/47 |
| 7,340,724 | B2 * | 3/2008 | Wolff et al. | 717/117 |
| 7,526,561 | B2 * | 4/2009 | Bloch et al. | 709/229 |
| 7,577,946 | B2 * | 8/2009 | Murakami et al. | 717/145 |
| 7,680,941 | B2 * | 3/2010 | Bloch et al. | 709/227 |
| 7,752,256 | B2 * | 7/2010 | Bloch et al. | 709/203 |
| 2002/0029256 | A1 * | 3/2002 | Zintel et al. | 709/218 |
| 2002/0143820 | A1 * | 10/2002 | Van Eaton et al. | 707/517 |
| 2002/0174329 | A1 * | 11/2002 | Bowler et al. | 713/1 |
| 2003/0051236 | A1 * | 3/2003 | Pace et al. | 717/177 |
| 2003/0237050 | A1 * | 12/2003 | Davidov et al. | 715/513 |
| 2004/0015463 | A1 * | 1/2004 | Herrera et al. | 706/47 |
| 2004/0015783 | A1 * | 1/2004 | Lennon et al. | 715/523 |
| 2004/0187090 | A1 * | 9/2004 | Meacham | 717/103 |
| 2004/0205562 | A1 * | 10/2004 | Rozek et al. | 715/513 |
| 2005/0015439 | A1 * | 1/2005 | Balaji et al. | 709/203 |

* cited by examiner

*Primary Examiner*—Leslie Wong
*Assistant Examiner*—Usmaan Saeed
(74) *Attorney, Agent, or Firm*—Vierra Magen Marcus & DeNiro LLP

(57) ABSTRACT

A method and apparatus for providing information by merging of an arbitrarily shaped data source with an arbitrary display hierarchy, including binding data in a source data file to application or content code. In one embodiment, the data source is an XML data file and the application is a rich Internet application provided by a presentation server. The method includes the steps of providing a structured data file; and merging the structured data file with a source file, the source file including at least one display element definition including an expression that refers to an arbitrary position or range within the data file. In another aspect, the invention is an apparatus. The apparatus includes one or more storage devices, and one or more processors in communication with said one or more storage devices. In this aspect, the processors perform a method comprising the steps of: accessing a mark-up language description of said particular content including at least one declaration of data in an XML document; and compiling said mark-up language description of said particular content to create executable code that provides said particular content, said step of compiling is performed at said server in response to said request.

41 Claims, 11 Drawing Sheets

Fig. 5 weather.cgi

```
<weather sourceurl="http://www.srh.noaa.gov/zipcity.php?inputstring=94103"> ~502
  <forecast> ~504
506~ <day label="TODAY" imageurl="http://www.laszlosystems.com/lz_weather/img/fcicons/sctfg.jpg" desc="Morning Fog" temp="Hi 80&#176; F"/>
508~ <day label="TONIGHT" imageurl="http://www.laszlosystems.com/lz_weather/img/fcicons/nbknfg.jpg" desc="Foggy Areas" temp="Lo 67&#176; F"/>
510~ <day label="TUESDAY" imageurl="http://www.laszlosystems.com/lz_weather/img/fcicons/hi_tsra.jpg" desc="T-storms Possible" temp="Hi 80&#176; F"/>
512~ <day label="TUESDAY" imageurl="http://www.laszlosystems.com/lz_weather/img/fcicons/hi_ntsra.jpg" desc="T-storms Possible" temp="Hi 70&#176; F Lo 68&#176; F"/>
514~ <day label="THURSDAY" imageurl="http://www.laszlosystems.com/lz_weather/img/fcicons/hi_tsra.jpg" desc="T-storms Possible" temp="Hi 70&#176; F"/>
  </forecast>
  <current> ~515
516~ <where>San Francisco, CA</where>
518~ <station>San Francisco Intl Airport</station>
520~ <when>Jul 28, 9:56 am PDT</when>
522~ <desc>Partly Cloudy</desc>
524~ <temp>60&#176;F</temp>
526~ <humidity>80 %</humidity>
528~ <windspeed>NW 12 MPH</windspeed>
530~ <barometer>30.00" (1015.8 mb)</barometer>
532~ <dewpoint>54&#176;F (12&#176;C)</dewpoint>
534~ <heatindex>None</heatindex>
  </current>
  <radar src="http://www.laszlosystems.com/lz_weather/img/radar/kmux.jpg"/> ~540
  <satellite src="http://www.laszlosystems.com/lz_weather/img/radar/WCI8.JPG"/> ~545
</weather>
```

Fig. 6A weather.lzx

```
<!-- Copyright 2002-2003 Laszlo Systems, Inc.  All Rights Reserved.      -->

602  <canvas width="240" height="320" bgcolor="#EAEAEA" title="Laszlo Weather">
       <!-- width="270" -->
       <splash>
       ...

       <!-- DATA SOURCE -->
605    <dataset name="weatherdata" src="http://www.laszlosystems.com/cgi-pub/weather.cgi">
       ...
610    <!-- CLASS: weatherSummary -->
       <class name="weatherSummary" font="Helvetica" fontsize="12" bgcolor="#000000" width="34" height="34" x="10" y="10">
         <image name="icon" width="32" height="32" stretches="both" x="1" y="1" datapath="@imageurl">
         <text name="day" x="42" fgcolor="#FFFFFF" width="140" fontstyle="bold" datapath="@label">Tonight</text>
         <text name="desc" x="42" y="14" fgcolor="#FFFFFF" width="140" datapath="@desc">T-storms possible</text>
         <text name="temp" x="168" width="60" fgcolor="#FFFFFF" fontstyle="bold" datapath="@temp">Hi 80 F</text>
       </class>
```

```
<view id="weatherApp" ...">
  <tabslider id="weatherContent" name="content" x="0" y="15" height="305" visible="false" slideduration="300" width="100%" datapath="weatherdata:/weather[1]">   618
    <weathertab name="tab1" label="Current Conditions"> <!-- -->  ~620
      <view id="currentData" width="240" y="10" datapath="current[1]">  ~622
        <view name="form" width="240" font="Helvetica" fontsize="14">
          <text name="where" width="240" x="15" fgcolor="#FFFFFF" fontstyle="bold" datapath="where[1]/text()">  ~ 624
          <image name="icon" x="18" y="23" width="64" height="64" stretches="both" datapath="/weather[1]/forecast[1]/day[1]/@imageurl">  ~ 626
          <text name="temp" x="95" y="20" width="240" fontsize="60" fgcolor="#FFFFFF" fontstyle="bold" datapath="temp[1]/text()">  ~ 628
          <text name="description" width="240" x="15" y="90" fgcolor="#FFFFFF" fontstyle="bold" datapath="desc[1]/text()">  ~ 630
        </view>
        <view name="moredata" x="15">
          <view name="labels">
      632 { <text fgcolor="#FFFFFF" width="90"><b>Humidity:</b></text>
            <text fgcolor="#FFFFFF"><b>Barometer:</b></text>
            <text fgcolor="#FFFFFF"><b>Windspeed:</b></text>
            <text fgcolor="#FFFFFF"><b>Dewpoint:</b></text>
            <text fgcolor="#FFFFFF"><b>Heatindex:</b></text>
            <text fgcolor="#FFFFFF"><b>Last Update:</b></text>
            <simplelayout axis="y" spacing="1">
          </view>
          <view name="fields">
      640 { <text name="humidity" width="160" fgcolor="#FFFFFF" datapath="humidity[1]/text()">
            <text name="barometer" width="160" fgcolor="#FFFFFF" datapath="barometer[1]/text()">
            <text name="windspeed" width="160" fgcolor="#FFFFFF" datapath="windspeed[1]/text()">
            <text name="dewpoint" width="160" fgcolor="#FFFFFF" datapath="dewpoint[1]/text()">
            <text name="heatindex" width="160" fgcolor="#FFFFFF" datapath="heatindex[1]/text()">
            <text name="when" width="160" fgcolor="#FFFFFF" datapath="when[1]/text()">
            <simplelayout axis="y" spacing="1">
          </view>
          <simplelayout axis="x" spacing="-10">
        </view>
        <simplelayout axis="y" spacing="10">
      </view>
    </weathertab>
```

Fig. 6C
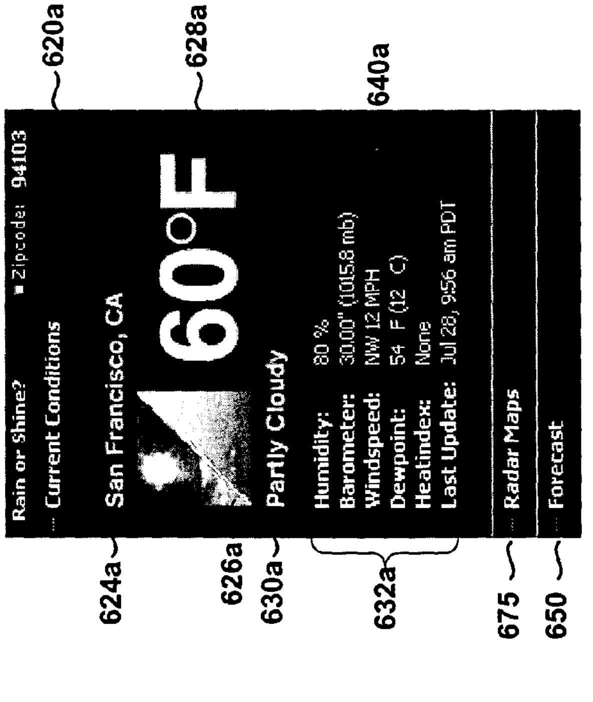
Fig. 6E
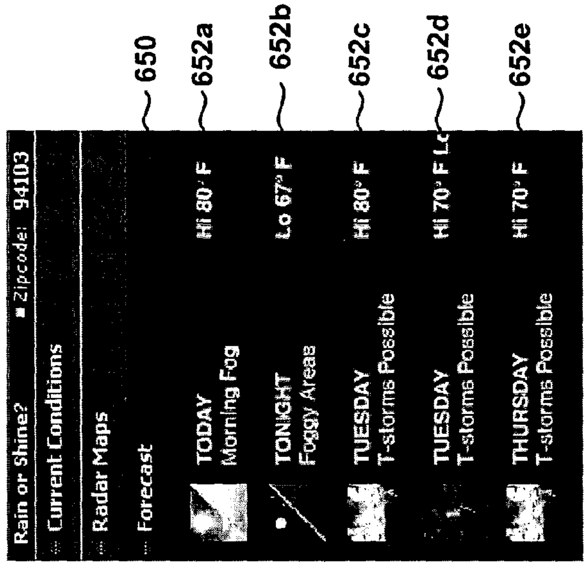
Fig. 6D
```
652 <weathertab name="tab3" label="Forecast"> <!--label="Forecast" -->
      <view id="forecastData" y="10">
        <weatherSummary datapath="forecast[1]/day">  652
        <simplelayout axis="y" spacing="10">
      </view>
    </weathertab
```

```
- <vcalendar>
      - <year2003>
            - <month7>
....
                  - <day17>
                        - <event>
                              <summary value="Susan's Birthday Party" /> ~ 702
                              <comment value="Party!" />
                              <start year="2003" month="7" day="17" hour="17" /> ~ 704
                              <end year="2003" month="7" day="17" hour="19" /> ~ 706
                          </event>
                  </day17>
.....
            </month7>
      </year2003>
 </vcalendar>
```

```
- <vcalendar>
    - <year2003>
        - <month7>
....
            - <day17>
                - <event>
                    <summary value="Susan's Birthday Party" />  ~ 702
                    <comment value="Party!" />
                    <start year="2003" month="7" day="17" hour="17" />  ~ 704
                    <end year="2003" month="7" day="17" hour="22" />  ~ 706'
                </event>
            </day17>
.....
        </month7>
    </year2003>
</vcalendar>
```

Fig. 8A

```
- <resultset>
  <result id="154" firstname="Chep" displayname="Yo" nickname="Yo" email="chep@arwins.com" home_default="0"
work_default="0" work_webpage="http://www.laszlosystems.com/" />
  <result id="146" firstname="Yahoo" middlename="Laszlo" lastname="Really" title="Mr." displayname="Really, Yahoo Laszlo"
nickname="Serious" email="yah@sirius.com" home_default="1" work_default="0" work_webpage="http://
www.laszlosystems.com/" />
  <result id="149" firstname="Joe" lastname="smoth" displayname="Joe Smith" email="joe@smith.com" home_address="2321
ANY St #3G" home_city="Berkeley" home_state="CA" home_zip="94705" home_country="USA" home_default="0"
home_webpage="http://www.smith.com" work_default="0" work_webpage="http://www.laszlosystems.com/" />
  <result id="16" firstname="Bret" lastname="Smile" displayname="Bret Smile" email="smile@foo.com" home_default="1"
home_phone="415-555-1212" home_mobile="(415) 555-1212" work_address="769 21st Street" work_default="0"
work_webpage="http://www.laszlosystems.com/" />
  <result id="140" firstname="Goober" middlename="H" lastname="Bloober" title="Mr" displayname="Bloober, Goober H"
email="goober@superduper.com;superdooooooo@doobledoo" home_default="1" work_city="foo city" work_default="0"
work_webpage="http://www.laszlosystems.com/" />
  <result id="19" firstname="Caprice" lastname="Smith" displayname="Caprice Smith"
email="caprice@foo.com;capricious@smith.net" home_default="0" work_default="0" work_webpage="http://
www.laszlosystems.com/" />

.
.
.
.

  <result id="92" firstname="Oliver" lastname="Steele" displayname="Oliver Steele" email="osteele@foo.com" home_default="0"
home_phone="617 555-1212" work_default="0" work_office="617-555-1212" work_webpage="http://www.laszlosystems.com/" />
  <result id="93" displayname="Oliver Steele" email="steele@foo.com" home_default="0" work_default="0"
work_webpage="http://www.laszlosystems.com/" />
  <result id="124" firstname="Voicemail" lastname="Home" displayname="Voicemail Home" home_default="0" work_default="0"
work_office="(415) 555-1212" work_webpage="http://www.laszlosystems.com/" />
  </resultset>
```

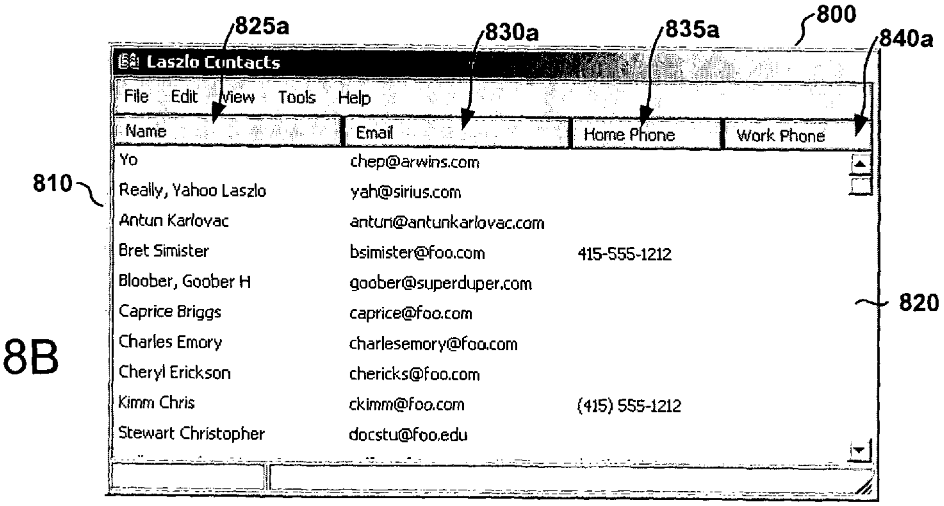

```
<view name="datarows" id="datarows" width="immediateParent.width">
   <view width="immediateParent.width" height="20" clickable="true" bgcolor="#FFFFFF" name="result"
onmousedown="datarows.selector.select( this ) ;" ondblclick="mainWindow.openSelection();">
      <datapath xpath="localdata:/resultset/*" name="codp" replication="lazy">
       <text x="2" y="2" datapath="@displayname" name="col1" width="columnbutton1.width - 2">
      </text>
      <text x="columnbutton2.x + 2" y="2" width="columnbutton2.width - 2" name="col2" datapath="@email">
       ...
      </text>
      <text x="columnbutton3.x + 2" y="2" width="columnbutton3.width - 2" datapath="@home_phone" name="col3">
      </text>
      <text x="columnbutton4.x + 2" y="2" width="columnbutton4.width - 2" datapath="@work_phone" name="col4">
      </text>
    </view>
```

850 822 825 830 835 840

APPLICATION DATA BINDING

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever

BACKGROUND OF THE INVENTION

1. Field of the Invention

The present invention is directed to technology for providing content via an Internet interface, and particularly to providing efficient data interpretation in code providing such content.

2. Description of the Related Art

The Internet has become a means to deliver more than communication to users. Currently, developers are striving to provide rich, powerful applications and content using the Internet. These applications have grown in sophistication. Earlier methods provided dynamic user interactions by downloading compliable and/or statically pre-compiled byte code directly to the client.

For example, Javascript code is often downloaded directly to the browser. The browser then interprets the code directly. This approach is limited because Javascript is typically not portable (different browsers offer differing support for the language) and the differences between browser Javascript API's severely limit the interactions that can be specified by the programmer. Alternatively, Java applets can be downloaded to a browser when a user accesses a web page. The Java source code for the applet is fixed, written in advance, and pre-compiled into an applet. When the user accesses the page, the applet is downloaded into the browser and the bytecode is interpreted (or compiled into machine code by a JIT compiler). One of several shortcomings of this approach is that Java is not sufficiently prevalent on all types of clients. That is, not all clients have the ability to interpret (or JIT compile) Java bytecode. Another shortcoming is that applets can be quite large to download and slow to run. Furthermore, creating Java applets is a complicated processes. Many web designers are not able or do not have the resources to take advantage of Java applets. Finally, because the code is written and compiled in advance, it is not dynamic.

An alternative to these attempts is provided in co-pending U.S. patent application Ser. No. 10/092,010 entitled "Presentation Server," filed Mar. 5, 2002 and application Ser. No. 10/092,360 entitled "Interface Engine Providing A Continuous User Interface," filed Mar. 5, 2002, both such applications are specifically incorporated herein by reference. These applications describe a system for providing rich Internet applications based on a presentation rendering system, and a unique user interface architecture, respectively.

In the aforesaid applications, underlying data is used by the rendering engine to present the application content to the user. The data source can be any number of suitable sources, such as a relational database, directory, other type of data structure. Because the number and type of applications which use data on the Internet, one standard for presenting data which has become widely popular is the Extensible Markup Language or XML. XML is a flexible way to create common information formats and share both the format and the data on the World Wide Web, intranets, and elsewhere. Because of the popularity of XML, it is possible to retrieve data from a number of different sources in this format. However, one must still interpret the data and provide a mechanism for extracting elements from the data. Conventionally, this is done by providing a query script which searches the XML data for elements needed for presentation in the application. In one example, this may occur through a series of "for" loops, which search for hierarchical data within the XML data file. However, this process is cumbersome to implement, both from a programming perspective and can make the code bulky and inefficient.

Another means for dealing with data in an XML document is Xpath. XPath is a language that describes a way to locate and process items in XML documents by using an addressing syntax based on a path through the document's logical structure or hierarchy. XPath also allows the programmer to deal with the document at a higher level of abstraction. XPath is a language that is used by and specified as part of both the Extensible Stylesheet Language Transformations (XSLT) and by XPointer (SML Pointer Language). It uses the information abstraction defined in the XML Information Set (Infoset). XPath specifies a route, rather than pointing to a specific set or sequence of characters, words, or other elements.

XPath uses the concepts of the concept node (the point from which the path address begins), the logical tree that is inherent in any XML document, and the concepts expressing logical relationships that are defined in the XML Information Set, such as ancestor, attribute, child, parent, and self. XPath includes a small set of expressions for specifying mathematics functions and the ability to be extended with other functions. While Xpath defines a standard for accessing documents, it does not define what one does with such data.

Other means have been provided which allow presentation of XML documents on the web. XSL Transformations (XSLT) is a standard way to describe how to transform (change) the structure of an XML (Extensible Markup Language) document into an XML document with a different structure. XSLT is a Recommendation of the World Wide Web Consortium (W3C). XSLT can be thought of as an extension of the Extensible Stylesheet Language (XSL). XSL is a language for formatting an XML document (for example, showing how the data described in the XML document should be presented in a Web page). XSLT shows how the XML document should be reorganized into another data structure (which could then be presented by following an XSL style sheet).

XSLT is used to describe how to transform the source tree or data structure of an XML document into the result tree for a new XML document, which can be completely different in structure. The coding for the XSLT is also referred to as a style sheet and can be combined with an XSL style sheet or be used independently.

In addition, the use of a resource file or data structure that specifies the layout of views within a window for display in a user interface has been known since developed by Apple Computer in the early 1980s. In the Macintosh Operating system, for example, a resource is stored on the local disk volume and divided into two forks, the data fork and the resource fork. The data fork contains data that usually corresponds to data created by the user; the application creating the file can store and interpret the data in the data fork in whatever manner is appropriate. The resource fork of a file consists of a resource map and the resources themselves. In this context, a resource is any data stored according to a defined structure in the resource fork of a file; the data in a resource is interpreted according to its resource type. Resources data typically has a defined structure—such as icons and sounds—and descriptions of menus, controls, dialog boxes, and windows. See, for example, the electronic book "Macintosh Toolbox Essentials" http://developer.apple.com/documentation/mac/Toolbox/Toolbox-2.html.

Nevertheless, there are no complete solutions today that provide complex, feature rich dynamic interactions in a client-server environment, and provide a mechanism for efficiently incorporating data from a multitude of sources into the dynamic interaction.

SUMMARY OF THE INVENTION

The present invention, roughly described, includes a method for providing information. The invention allows merging of an arbitrarily shaped data source with an arbitrary display hierarchy, and includes, in one aspect, binding data in a source data file to application or content code. The invention allows for the creation of program objects that retain a live connection with the entities of the data source.

In one embodiment, the data source is an XML data file and the application is a rich Internet application provided by a presentation server.

In a first aspect, the invention includes a method for binding display hierarchy with a data hierarchy. The method includes the steps of providing a structured data file; and merging the structured data file with a source file, the source file including at least one display element definition including an expression that refers to an arbitrary position or range within the data file.

In a further aspect, the invention comprises the steps of: providing an hierarchical data file; and accessing a mark-up language description of said content including at least one declaration of data in said hierarchical data file. In a further aspect, the step of compiling said mark-up language description of said content to create executable code that provides particular content to a renderer is performed.

In a further aspect, the data document is an XML document. This XML document can be included (compiled) into the application, or requested by the client at runtime. Data can come from a remote computer, or the server's local storage. Furthermore, then only change required is in the datasource declaration of the application source—the rest of the application stays is the same. In addition, the method may be performed on a server, and the method includes the additional step of transmitting said executable code to a client.

In yet another aspect, the invention comprises one or more processor readable storage devices having processor readable code embodied on said processor readable storage devices. The processor readable code for programming one or more processors to perform a method comprising the steps of: providing an XML document; accessing a mark-up language description of said particular content including at least one declaration of data in said XML document; and compiling said mark-up language description of said particular content to create executable code that provides said particular content to a renderer.

In another aspect, the invention is an apparatus. The apparatus includes one or more storage devices, and one or more processors in communication with said one or more storage devices. In this aspect, the processors perform a method comprising the steps of: accessing a mark-up language description of said particular content including at least one declaration of data in an XML document; and compiling said mark-up language description of said particular content to create executable code that provides said particular content, said step of compiling is performed at said server in response to said request.

In another embodiment, the invention is a method of providing a rich Internet application. The method includes the steps of: receiving a request for particular content, said request is received at a server; retrieving hierarchical data file; accessing a code description of said particular content including at least one declaration of data in said hierarchical data file; compiling said code description of said particular content to create executable code, said step of compiling is performed at said server in response to said request; and transmitting said executable code from said server to a client.

In another aspect, the invention is an apparatus for providing a rich Internet application. The apparatus includes: means for receiving a request for particular content, said request is received at a server; means for retrieving hierarchical data file; means for accessing a code description of said particular content including at least one declaration of data in said hierarchical data file; means for compiling said code description of said particular content to create executable code, said step of compiling is performed at said server in response to said request; and means for transmitting said executable code from said server to a client.

The present invention can be accomplished using hardware, software, or a combination of both hardware and software. The software used for the present invention is stored on one or more processor readable storage devices including hard disk drives, CD-ROMs, DVDs, optical disks, floppy disks, tape drives, RAM, ROM or other suitable storage devices. In one embodiment, the software can be performed by one or more processors. In alternative embodiments, some or all of the software can be replaced by dedicated hardware including custom integrated circuits, gate arrays, FPGAs, PLDs, and special purpose processors. One example of hardware that can implement all or portions of the present invention includes a processor, storage elements, peripheral devices, input/output devices, displays, and communication interfaces, in communication with each other as appropriate for the particular implementation.

The advantages of the present invention will appear more clearly from the following description in which the preferred embodiment of the invention has been set forth in conjunction with the drawings.

BRIEF DESCRIPTION OF THE DRAWINGS

The invention will be described with respect to the particular embodiments thereof. Other objects, features, and advantages of the invention will become apparent with reference to the specification and drawings in which:

FIG. 5 is an exemplary XML data file listing for a weather application provided by the presentation server according to one embodiment of the present invention.

FIG. 6A is a portion of a source code listing for an exemplary weather application provided by the presentation server according to one embodiment of the present invention.

FIG. 6B is a second portion of a source code listing for an exemplary weather application provided by the presentation server according to one embodiment of the present invention.

FIG. 6C is an exemplary view window generated by the presentation server using the source code shown in FIG. 6B and the data of FIG. 5.

FIG. 6D is a portion of a source code listing for an exemplary weather application provided by the presentation server according to one embodiment of the present invention.

FIG. 6E is an exemplary view window generated by the presentation server using the source code shown in FIG. 6D and the data of FIG. 5.

FIG. 8A is an exemplary XML data file listing for a contacts application provided by the presentation server according to one embodiment of the present invention.

FIG. 8B is an exemplary view window of a contacts application generated using the source code of FIG. 9C and the data of FIG. 9A.

FIG. 8C is a portion of a source code listing for an exemplary calendar application provided by the presentation server according to one embodiment of the present invention.

DETAILED DESCRIPTION

Figure 1:
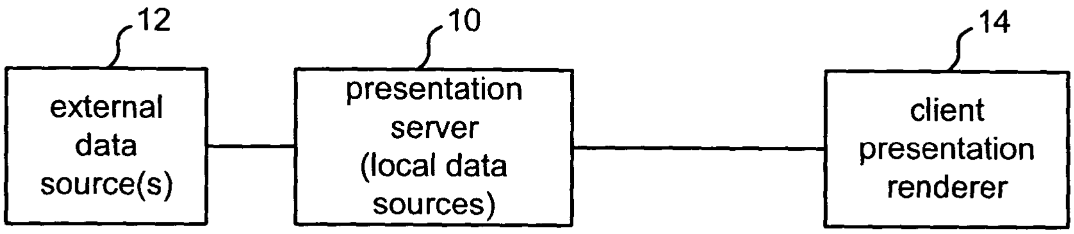
FIG. 1 is a block diagram of one embodiment of the present invention.

The invention provides a unique means to merge an arbitrarily shaped data source with an arbitrary display hierarchy. More generally, the invention includes binding data in a source data file to application or content code. This is in contrast to, for example, mailing list merge programs, which merge items from a flat table where the names of the fields of each row can be specified in the mail message template, but the shape of the data source can not be changed. In addition, the invention is unique in that it allows for the creation of program objects that retain a live connection with the entities of the data source.

In one embodiment, the data source is an XML data file and the application is a rich Internet application provided by a presentation server. However, the invention is not limited to such applications or data sources. For example, the invention may be implemented by an interpreter of a source code file, where no compiler or bytecodes are used, but the interpreter creates objects while parsing the program source text. A further implementation may be provided where binding against a tabular data source such as an SQL result is provided.

In a further unique aspect, the system can create an arbitrary bit of view hierarchy to represent each element in a set of selected data. The invention provides a mechanism for the application or content to easily update the user perception of the underlying data by directly binding the location of the data in arbitrarily structured data file to the code, so that updates of the data are instantly reflected in the application or content presented to the user. This also allows the application to take advantage of data provided by third party data providers to update the content or application.

A brief example of the invention in presentation code is provided,. In a further aspect, the invention is implemented on a presentation server, which is briefly described with respect to FIGS. 1-4. Finally, more specific examples of the invention are presented with respect to FIGS. 5-8C.

The presentation server responds to instructions from one or more language source files, which may be compiled and run by a client. Source code files may include one or more Laszlo application language source files, as described in application Ser. Nos. 10/092,010 and 10/092,360. The Laszlo application language is an application of XML, with ECMAScript used to specify user interface behaviors and application logic. ECMAScript code is contained within script tags, or as the value of certain attributes. This is similar to the use of DHTML, (the combination of HTML and browser JavaScript) or JavaScript to enhance HTML pages, except that the document specifies the view structure of an application, rather than the text structure of a page. However, other source languages are possible and contemplated as being within the scope of the present invention. Elements of the invention exemplified herein are shown in Lazlo application language, however other examples are provided as well.

In the context this description, examples of application language source files are presented as an XML file. In these examples, an application source file may contain at most one canvas element. If a canvas element is present, it must precede (or contain) any other view elements. The canvas element defines properties of the global canvas, which is the root of the runtime view hierarchy; all other views are directly or indirectly contained within the canvas element. Examples of the different elements include:

Class tags;

View class definitions;

Scripts, for program logic;

Methods; and

Data source connection definitions.

A class is a named, reusable collections of views, methods (functions) and attributes (variables). Classes extend view tags. All view tags and text can be extended and reused using OOP techniques which is instantiated when the application is run. A class may occur immediately within the document root element, or nested within another class (or a class definition). A class that occurs directly within the document root element is a root class. An application source file may contain any number of root classes, and they may be interleaved with other elements, such as script, data source elements and class definitions. If an application doesn't contain any classes, it will have no visible behavior, unless its script code uses the view system API to create a view programmatically.

A view instance may also contain one or more references to media. One example of a reference to media is an image reference. An image reference is a reference to an external image, an animation or an embedded svg element. In the present invention, these image references are imbedded in the source code by means of a declarative statement that accesses such references directly, as will be explained in further detail with reference to FIGS. 5-9. Like data, resources can be compiled into the application or loaded at runtime.

A first embodiment of the present invention is set forth below in an example of Laszlo code that uses these elements and demonstrates the binding views that are defined in the program source against data that is supplied during the execution of the program. The code will become clearer to the reader as the discussion continues. A first example of the present invention is provided by the following example:

```
<canvas>
    <view layout="axis: y; spacing: 4">
        <text>789</text>
        <text>456</text>
        <text>123</text>
        <text>0.e</text>
    </view>
</canvas>
```

In the context of the presentation language, this code would display four rows of text displaying "789", "456", "123", and "0.e".

The following program displays the same results, but separates the data hierarchy (between the lines "<dataset>" and "</dataset>") from the view hierarchy (between the lines "<view>" and "</view>"):

```
<canvas>
  <dataset name="mydata">
    <table>
      <row>789</row>
      <row>456</row>
      <row>123</row>
      <row>0.e</row>
    </table>
  </dataset>
  <view datapath="mydata:/table" layout="axis: y; spacing: 4">
      <text datapath="row/text( )" width="40"/>
  </view>
</canvas>
```

The view element defined the datapath by a declarative statement: "view datapath=mydata'/table'". In this example, the dataset is within the same textual file as the view hierarchy. The data is compiled in the resulting application. The data is separated from the view hierarchy in the source hierarchy. When the source view hierarchy is applied to the data to produce the presentation hierarchy, it is implementation dependent.

As illustrated in the below, the dataset could be moved to a separate file data.xml that contains this text:

```
[data.xml]
    <table>
        <row>789</row>
        <row>456</row>
        <row>123</row>
        <row>0.e</row>
    </table>
```

and the program could be rewritten as this:

```
<canvas>
  <dataset name="mydata" src="data.xml">
  <view datapath="mydata:/table" layout="axis: y; spacing: 4">
        <text datapath="row/text( )" width="40"/>
  </view>
</canvas>
```

Hence, the dataset may be provided in a separate file, and the data bound to the display element by a declarative statement in the view element. Again, the data is compiled into the resulting application, even though stored in a separate file. This example still outputs the same text: displaying "789", "456", "123", and "0.e", but the data and view hierarchy have been segregated into separate files. The foregoing is an example of external/internal data independence.

If data.xml were changed to contain another level of hierarchy:

```
<table>
    <row><cell>7</cell><cell>8</cell><cell>9</cell></row>
    <row><cell>4</cell><cell>5</cell><cell>6</cell></row>
    <row><cell>1</cell><cell>2</cell><cell>3</cell></row>
    <row><cell>0</cell><cell>.</cell><cell>E</cell></row>
</table>
```

and the view hierarchy were changed as well:

```
<canvas>
  <dataset name="mydata" src="data.xml">
  <view datapath="mydata:/table" layout="axis: y; spacing: 4">
    <view datapath="row"/>
      <text datapath="cell/text( )" width="40"/>
    </view>
  </view>
</canvas>
```

then the program would display a 3×4 array of text.

In addition, the data source need not be provided locally. If the <dataset> line of the previous program is replaced with: <dataset name="mydata" src="http://my.host.com/data.xml"> or: <dataset name="mydata" src="http://my.host.com/data.jsp">, views in the program source may be bound to against data that is supplied during the execution of the program.

The above-described mark-up language can be used to describe many different user interfaces. The Laszlo application language provides one example of a suitable mark-up language that can be used with the present invention. Other mark-up languages/formats can also be used. In one embodiment, a set of one or more files using the above-described (or another) mark-up language are compiled to create executable code for a presentation renderer. One example of a presentation renderer is the Macromedia Flash Player, which uses the SWF file format for its executable code.

The exact type of user interface is not important to the present invention. One example of a user interface system can be found in co-pending application Ser. No. 10/092,360 entitled "Interface Engine Providing A Continuous User Interface", assigned to the assignee of the present application and specifically incorporated herein by reference.

In accordance with the invention, the invention may be practiced on a presentation server and user interface. A presentation server and user interface suitable for use with the present invention are detailed in co-pending application Ser. Nos. 10/092,010 and 10/092,360.

For clarity in understanding the method and the system of the present invention, a brief description of the presentation server disclosed application Ser. No. 10/092,010 is provided. In one embodiment, the presentation server includes server-deployed software that enables developers to easily and economically create network-aware applications with rich, interactive user-interfaces. The presentation server is designed to receive a mark-up language description of a user-interface and dynamically compile that mark-up language description to executable code. In one environment, the mark-up language description is an XML-based language that is designed specifically for describing an application's user interface, along with the connection of that user-interface to various data sources and/or web services. It contains standard user interface primitives like "window," "button," "text," "scroll bar," and so on, as well as syntax for automatically connecting user-interface items with back-end data sources and services. The mark-up language can also include a scripting language for procedural specification of application behavior that is similar to Javascript.

In one embodiment, the presentation server generates highly optimized/compressed object code for a given Presentation Renderer. A Presentation Renderer is a software environment, hardware, set of one or more software programs, etc. that can display graphics and play sound. FIG. 1 is a block diagram providing a high-level description of one exemplary implementation of the present invention. FIG. 1 shows Presentation Server 10 in communication with external data source(s) 12 and client Presentation Renderer 14. Data sources can also be local to the presentation server, in memory or on disk. Data can be compiled into the application and/or requested by the client as the application runs. Communication between the various elements can be via network, dedicated connection, wireless connection, or any other connection that is suitable for appropriate communication. The external data sources can include databases, directories, web services, or any other storage device or structure that can hold data. Client Presentation Renderer 14 can be generic software for providing a user-interface or can be specific software for the purpose of communicating with Presentation Server 10.

In one embodiment, client Presentation Renderer 14 is a Macromedia Flash Player embedded in a web client as a plug-in. While the Flash Player is an appropriate vehicle for Presentation Server 10, there is nothing inherent in the design of Presentation Server 10 that requires the Flash Player. Many other presentation renderers can also be utilized.

Figure 2:
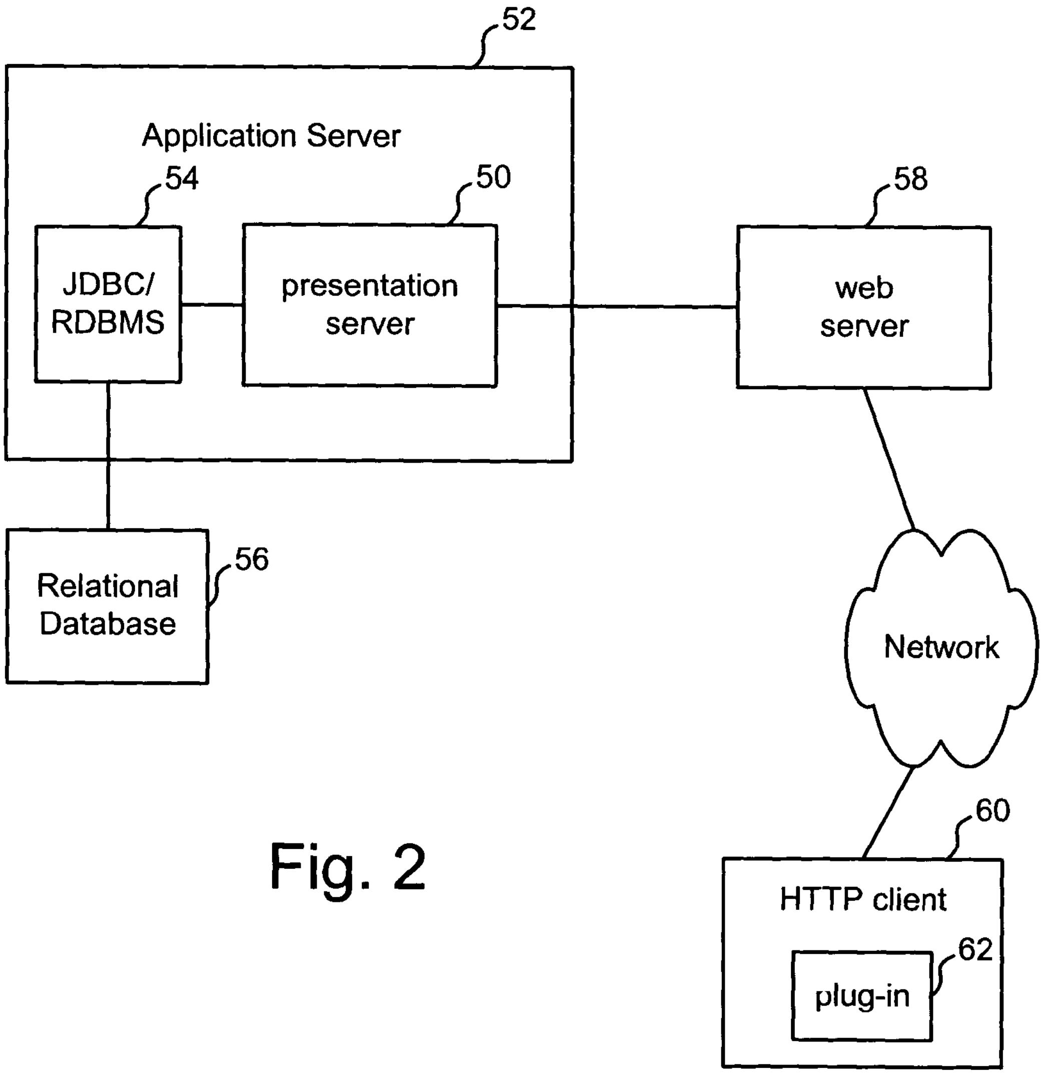
FIG. 2 is a block diagram of a second embodiment of the present invention.

FIG. 2 is a block diagram of another embodiment of the present invention. FIG. 2 shows Presentation Server 50 implemented as a Java Servlet that compiles server located mark-up language description files and data into object code. In one embodiment, Presentation Server 50 generates object code for the Macromedia Flash Player. Presentation Server 50 can be hosted by any standard Java Servlet implementation, including Jakarta Tomcat and servlet container servers like BEA Weblogic and IBM Websphere. When hosted in a servlet container server, the presentation server takes advantage of services that are available including JDBC and JCA. FIG. 2 shows Presentation Server 50 hosted in Application Server 52. Application server 52 may also include JDBC to RDBMS services which are in communication with relational database 56. As stated above, other types of data sources, other than a relational database can also be used. Presentation Server 50 receives requests and sends responses via Web Server 58, which is in communication with clients via a network. That network can be any standard network known in the art, including the Internet, a LAN, a WAN, etc. For example, FIG. 2 shows an HTTP client 60 (e.g. browser) with plug-in 62 (e.g. Flash Player) in communication with Presentation Server 50 via Web Server 58.

Figure 3:
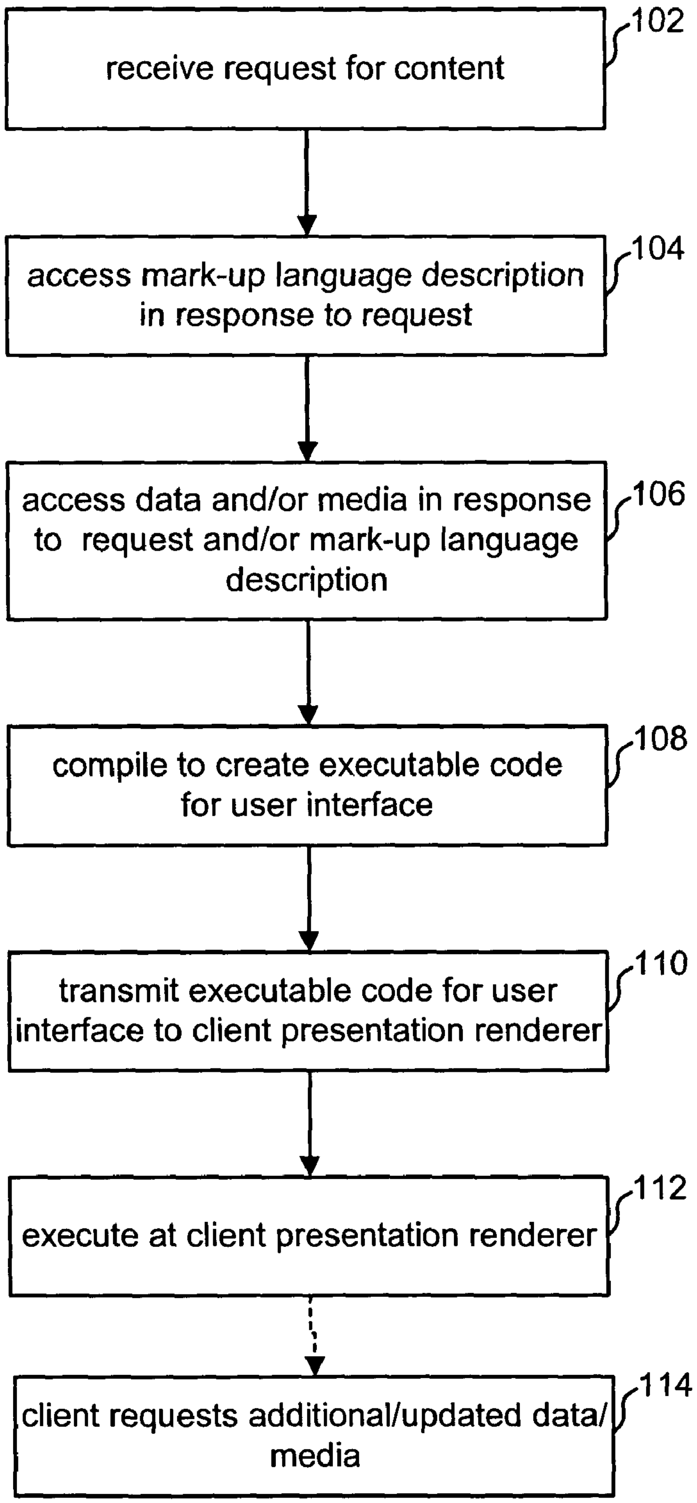
FIG. 3 is a flow chart describing one embodiment of a process for implementing the present invention.

FIG. 3 is a flow chart describing one exemplary embodiment of the operation of the present invention. In step 102, the Presentation Server receives a request for content. The content can be a Web page, media, data, an application, or anything else accessible via a network. In step 104, the Presentation Server accesses a mark-up language description of the content in response to the received request. In some embodiments, a mark-up language description is not used and, thus, step 104 is not performed. In step 106, Presentation Server accesses any data and/or media in response to the request or in response to the mark-up language description. In some instances, the request will not require any data or media and, therefore, step 106 can be skipped. In step 108, the mark-up language description, data and/or media are complied to create executable code for a user interface. In step 110, the executable code is transmitted to the client Presentation Renderer. In step 112, the executable code is executed at the client Presentation Renderer. At step 114, the application may request additional or updated data or media as the application is executed on client. As indicated by the dashed line connecting this step to step 112, this step is optional.

Figure 4:
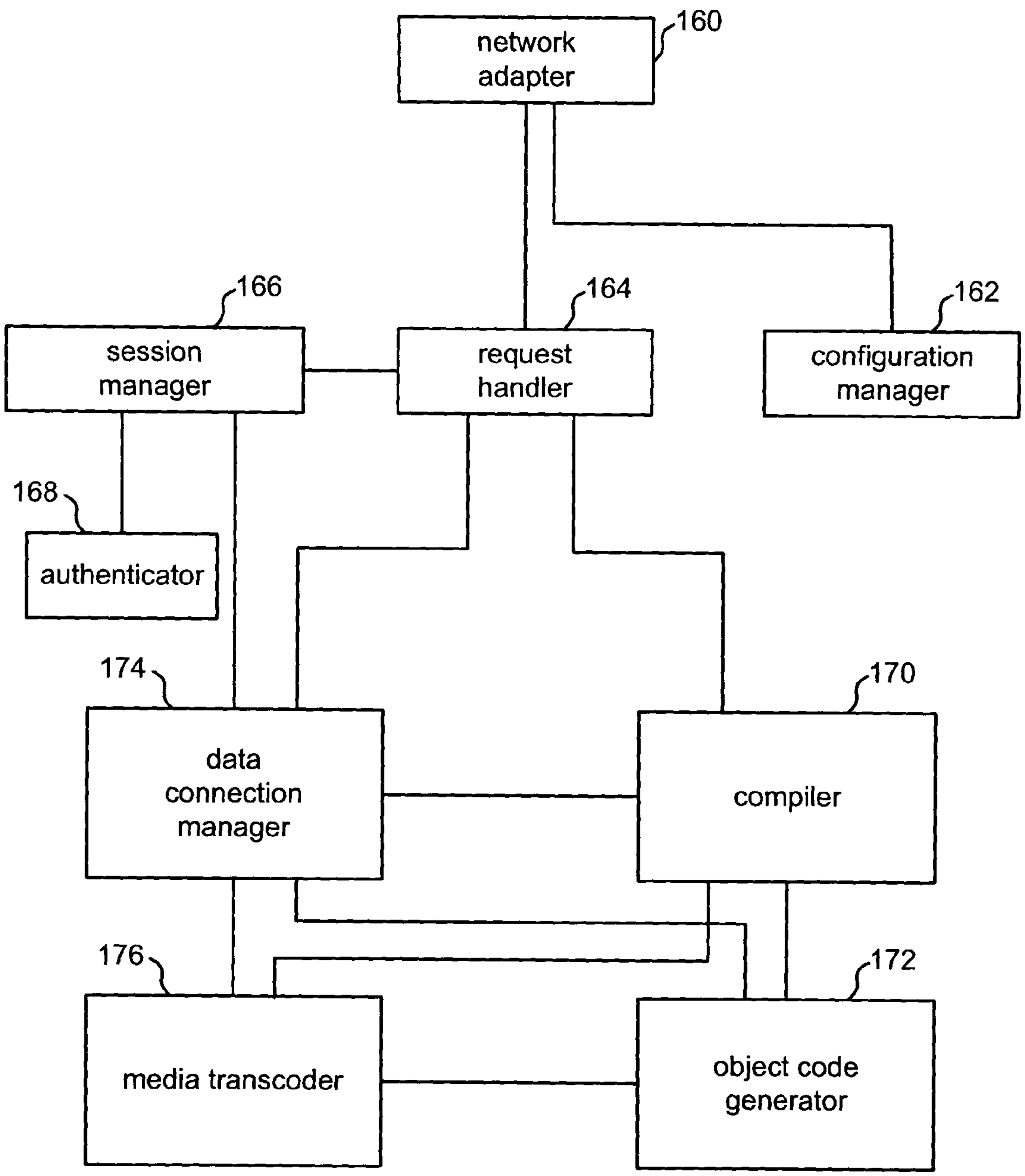
FIG. 4 is a block diagram of a presentation server according to one embodiment of the present invention.

FIG. 4 is a block diagram of one exemplary architecture for the Presentation Server. The main entry point to the Presentation Server is Network Adaptor 160, which is used to connect to the host. In one implementation, Network Adaptor 160 can include an implementation of the standard JAVA HttpServlet interface. At initialization time, this servlet receives configuration parameters from Configuration Manager 162. Configuration Manager 162 reads the configuration information from a local disk or other storage device. This information can include the desired logging (file names and level of status/error/debug logging), URL matching rules (patterns that describe how URLs map to local file system names), and authentication rules (patterns that describe which request require authentication). Configuration Manager 162 also keeps track of the plug-ins that are available for each of the plug interfaces in the presentation server. For example, Authenticator 168, discussed below, can include plug-ins for JDBC, LDAP, or other. Data Connection Manager 174 can include plug-ins for Java, JDBC, SOAP, XML RPC, or other. Media Transcoder 176 can include interfaces for images (JPEG, GIF, BMP, PNG, other), audio (MP3, WAV, other), graphics (SVG, HTML, PDF, SWF, other), and video (MPEG, MPEG2, SORENSON, REAL, Animated GIF, other).

The Presentation Server listens for requests coming into the application server and/or web server via HTTP. As discussed, the Presentation Server can be within a web server, application server, or other system. The URLs for these requests are partially configurable at deployment time (some configuration via the HTTP Daemon and Servlet container, with additional configuration via Configuration Manager 162). Requests are handled by Request Handler 164. In one embodiment, a request can be for an application, data, service or other type of content. Each of these types of requests will be handled by Request Handier 164. Each request is associated with a session object, which is managed by Session Manager 166. Session Manager 166 can also access any one of a set of one or more Authenticators 168. In one embodiment, there can be one authenticator for each different type of authentication, for each type of content, or for each item of content. Each authenticator can be a plug-in, as described above. Request Handler 164 then communicates with Compiler 170 in order to compile the mark-up language descriptions of the requested content to object code. Compiler 170 communicates with Object Code Generator 172 to generate the object code. Request Handler 164 also communicates with Data Connection Manager 174 in order to receive data from or write data to external data sources. Data Connection Manager communicates with Object Code Generator 172 to generate object, which includes data received from these external sources. After the application is sent to the client, run-time data requests are processed by the Data Connection Manager through the Request Handler.

FIG. 4 also shows Media Transcoder 176 in communication with Compiler 170, Object Code Generator 172, and Data Connection Manager 174. Media Transcoder 176 is used to transform media from unsupported formats to supported formats. For example, the Presentation Renderer may only be able to utilize media in certain preset formats, for example, perhaps the Presentation Render only accepts images that are JPEG. Thus Media Transcoder 176 will transform all images from whatever format they are in to JPEG. The system will know the accepted formats for any particular renderer and will use Media Transcoder 176 to transform media to those accepted formats. After the application is sent to the client, run-time media requests are processed by the Media Transcoder through the Request Handler.

As stated above, some embodiments include the Presentation Server accessing a mark-up language description of the content requested. There are many different variations of mark-up languages that are suitable for the present invention. XML provides one example of a suitable framework for a mark-up language. One embodiment of the present invention uses an application of XML, referred to as the Laszlo application language and described in co-pending application Ser. Nos. 10/092,010 and 10/092,960.

In accordance with the present invention, one method of accessing a datasource where such datasource is an XML document includes providing a declaration of the location of the data in the hierarchical structure of the XML document. In this technique, data contained in the XML document is bound to the source code by a declarative statement of its location in the XML.

A basic example of the present invention illustrating the extraction of the content text of an XML entity is set forth below. In accordance with the present invention, a declarative statement based on the XML document hierarchy is used.

In one embodiment, this declarative statement complies with the XPATH standard definition found at XML Path Language (XPath) Version 1.0, W3C Recommendation 16 Nov. 1999, http://www.w3.org/TR/xpath, fully incorporated herein by reference. The XPATH language describes a way to locate and process items in XML documents by using addressing the syntax based on a path through the document's logical structure or hierarchy. XPATH defines a route to the particular data in question. XPATH uses the concepts of the concept node (the point from which the path address begins), the logical tree that is inherent in any XML document, and the concepts expressing logical relationships that are defined in the XML information set, such as ancestor, attribute, child, parent, and self. XPATH also includes a small set of expressions for specifying mathematics functions and the ability to extend other functions. XPATH utilizes different types of nodes, including elements, attributes and text. The XPATH standard defines a way to compute a string-value for each type of node. Some types of nodes also have names. The name of a node is modeled as a pair consisting of a local part and, possibly a null name space url.

The following code displays a single text view that contains the string "text".

```
<canvas>
  <dataset name="ds">
    <entity>text</entity>
  </dataset>
  <text datapath="ds:/entity/text( )"/>
</canvas>
```

The following code illustrates the extraction of an attribute value. It displays a single text view that contains the string "attr".

```
<canvas>
  <dataset name="ds">
    <entitty attr="attr">text</entity>
  </dataset>
  <text datapath="ds:/entity/@attr"/>
</canvas>
```

From the foregoing examples, the more specific examples of applications created using the present invention and discussed with respect to FIGS. 5-9 will be understood.

FIG. 5 is an exemplary XML document (weather.cgi) which contains data for use with a weather application which may be provided by the presentation server discussed above. An exemplary display window which is shown by the presentation server on the user interface described above is shown in FIG. 6C. FIG. 6C is a window displayed using a presentation renderer via an Internet browser. This window is an example of a weather application showing weather in San Francisco, Calif., (zip code 94103) whose data comes from an XML file such as that shown in FIG. 5.

In a unique aspect of the present invention, the XML document can be compiled into the application, or requested by the client, at runtime. Data may be provided from a remote computer, or the server's local storage. In a further aspect of the invention, the only change then required is in the datasource declaration of the application source; the rest of the application stays the same. This is a major benefit to developers who can use a local test data and easily change to a live data source when it becomes available.

The weather.cgi document includes a root definition, shown at reference number 502, identifying the root as "weather" and declaring a sourceurl of the National Weather Service (noaa.gov) website for data contained in the document. In accordance with one aspect of the present invention, the source data document may be provided by a third party. As long as the data structure of the document is maintained consistently by the providing entity, in this case the National Weather Service, the data declarations in the Laszlo code wed to generate applications will be able to interpret the data and generate content for provision to a user. Note that the syntax of this code allows a relatively easy change to the datasource by simply defining a different source url for the XML source document.

The weather root includes four children: forecast data 504, current data 515, radar data 540 and satellite data 545. Forecast data includes data labels for a number of days 506, 608, 510, 512, 514. Current data 515, includes definitions for location data 516 ("where"), station data 518 ("station"), time data 518, description data 522, temperature data 524, humidity data 526, wind speed data 528, barometer data 530, dew point data 532, and heat index data 534. The radar 540 and satellite 545 declarations identify image sources for radar and satellite data used in the weather window.

FIGS. 6A, 6B, and 6D show source code portions of an exemplary weather application, weather.lzx, which, when compiled by the presentation server of the present invention, will produce the windows shown in FIGS. 6D and 6E. FIG. 6A shows a first portion of the source code for the weather application. In this portion, the source code sets a canvas definition 602, and also specifies a canvas data source 605. As will be understood from the following description, this canvas data source will serve as the default root for declarations to data in the source code of the weather application. In this case, the data set name 605 is specified as the weather.cgi XML file shown in FIG. 5. A class definition 610 defines a new tag, "weathersummary," used later and specifies a number of data paths for variables in the weather summary class. The XML data can come from a remote URL, a URL on the same server, the file system, or memory. In this case, it's loaded from a remote URL.

As noted above, in previous presentation applications, a developer seeking to parse the data shown in FIG. 5 to determine, for example, elements of the data which need to presented in windows 6C and 6E would utilize script to search for elements in the data which were needed for the presentation. In accordance with the present invention, a declarative statement based on the XML document hierarchy is used as an alternative to this scripting process.

FIG. 6B and FIG. 6C show examples of the declarative nature of the data binding used in the present invention. FIG. 6C shows a window display of the data wherein the user is presented with three display selection tabs, 620A for the current conditions, 675 for radar maps, and 650 for forecast data. These tabs are defined in the code as "weathertabs", of which the current tab is shown in FIG. 6C with corresponding source code in FIG. 6B, and the forecast tab is shown in FIG. 6E with corresponding code shown in FIG. 6D.

Initially, the location of the root data in the data source "weatherdata" (from line 605 in FIG. 6A) is defined at 618. This indicates to all nested code in the "tabslider" definition, that the root definition for data is the "/weather" root of the "weatherdata" file.

Referring to FIG. 6C, weathertab "current conditions" 620A is defined by the weather tab "tab 1" declaration 620 in the source code of FIG. 6B. For each tab, a view is defined. A view ID "current data" 622 is defined by text and image data 624, 626, 628, and 630. This data maps is displayed by presentation renderer 14 as the window shown in FIG. 6C. For example, the location text at 624A is derived from the declarative statement at line 624. The data path declaration "datapath=indicates that the location specification text data "San Francisco, Calif." can be found in the weather.cgi XML document. The data source file is defined in line 605 and the "current" data node was defined in line 622, which is relative to line 618. The declaration "where [1]/text( )"" is an example of a relative location path and the expression "where[1]/text( )" specifies the node "where" and the text attributes in the XML data. A relative location path consists of a sequence of one or more location steps separated by a "/." The steps in a relative location path are composed together from left to right. Each step in turn selects a set of nodes relative to a context node. An initial sequence of steps is composed together with a following step as follows. The initial sequence of steps selects a set of nodes relative to a context node. Each node in that set is used as a context node for the following step. The sets of nodes identified by that step are unioned together. The set of nodes identified by the composition of the steps is this union. For example, child::div/child::para selects the para element children of the div element children of the context node, or, in other words, the para element grandchildren that have div parents. In this manner, the hierarchy of weather.cgi (the weather dataset) is /weather/forecast/day or /weather/current/where, etc. Weather.cgi specifies the parent note, relative to the current location.

This feature of the present invention is illustrated in the following code which displays two lines of text, containing "a1" and "a2", respectively.

```
<canvas>
  <dataset name="ds">
    <entity a="a1" b="a2"/>
  </dataset>
  <simplelayout axis="y"/>
  <text datapath="ds:/entity/@a"/>
  <text datapath="ds:/entity/@b"/>
</canvas>
```

To illustrate the concept that the data context of a child in the display hierarchy is implicitly the data context of its parent, consider that the following code displays a "1":

```
<canvas>
  <dataset name="ds">
    <entity a="1">
      <entity a="2"/>
    </entity>
  </dataset>
  <text datapath="ds:/entity/@a"/>
</canvas>
```

However, the following code displays a "2":

```
<canvas>
  <dataset name="ds">
    <entity a="1">
      <entity a="2"/>
    </entity>
  </dataset>
  <text datapath="ds:/entity/entity/@a"/>
</canvas>
```

The difference being the datapath declaration "ds:/entity/entity/@a"/" in the above code versus "ds:/entity/@a" in the previous example. In addition, the following text would display a "2" as well:

```
<canvas>
  <dataset name="ds">
    <entity a="1">
      <entity a="2"/>
    </entity>
  </dataset>
  <view datapath="ds:/entity">
    <text datapath="entity/@a"/>
  </view>
</canvas>
```

because the <view> establishes a context of the outer <entity a="1">, and the datapath of the <text> is resolved relative to this context (because the <text> is nested inside the <view>).

From the foregoing example, it can be seen that the hierarchal structure in the weather.cgi XML document can be addressed using the hierarchal command syntax relative to any parent group.

As will be understood by one of average skill in the art, this declarative data binding makes programming expressions much easier than if each code expression had to understand technical XML markup and its sequence in the document. This allows a programmer to deal with the document at a higher level of extraction. As noted above, XPATH includes a small set of expressions for specifying mathematics functions and the ability to extend other functions. In addition, it allows the use of location steps. An example of a location step is shown in lines 622 and 624 in the brackets following the "current" and "where" instances. In this case, the bracketed "1"s tell the source code that the data is contained in the first instance of the current definition and the first instance of the "where" definition. Location steps can operate as modifiers and operate mathematically. In addition, they need not be numerical. A location step has three parts: an axis, which specifies the tree relationship between the nodes selected by the location step and the context node; a node test, which specifies the node type and expanded-name of the nodes selected by the location step, and zero or more predicates, which use arbitrary expressions to further refine the set of nodes selected by the location step. Use of these location steps (as well as the functions defined in the Xpath specification,) make the declaration of the data in the XML document in the source a powerful tool.

In one embodiment, the following location declarations may be used and have the following meanings:

[8] eighth only

*[-4] up to and including the fourth

*[3-] from the third onwards

*[5-6] the fifth and sixth where (*) denotes possible replication on multiple matches. Note that any number may be provided in the declaration, as required.

Line 626 shows another exemplary declaration wherein the data path is returned to the root of the weather.cgi file. In the view definition, the data path is set to "current" (515 in FIG. 5), but the image display icon definition at line 626 requires the image data from "imageurl" located in the forecast data 504. As such, the forward slash in the expression "/weather[1]/forecast[1]/day[1]/@imageurl" returns the declaration to the root data's definition at 502 in the weather.cgi dataset of FIG. 5. This declaration is an example of an absolute location path. An absolute location path consists of a "/" optionally followed by a relative location path. A "/" at the beginning of a path selects the root node of the document containing the context node. Absolute data paths may also specify another dataset, e.g. "weatherdata2:/". If it is followed by a relative location path, then the location path selects the set of nodes that would be selected by the relative location path relative to the root node of the document containing the context node. Note that the path reference ". . . /" can also be used to select the parent node relative to the current data context. This also retrieves the imageurl data and displays the image with the parameters specified in the source code at line 626. The expressions for temperature at 628 and the descriptive text at 630 are again set forth as relative to the "current" data set. As shown in FIG. 6C, this data is displayed based on the view definition 622. Additional view data 640 is displayed at 640A in FIG. 6C as defined by code 630.

As noted above, FIG. 6C includes two additional display select tabs, radar maps 675, and forecast 650. When the user interacts with these tabs by, for example, clicking on them in a user interface, different data will be displayed. One example of this data is the forecast tab shown in FIG. 6E. The corresponding source code definition is shown in FIG. 6D. FIG. 6D, like the source code set forth in FIG. 6B, displays data from XML file weather.cgi in FIG. 5. However, the source code in FIG. 6D utilizes another unique aspect of the present invention, that of replication.

Returning to FIG. 6C, at line 650, the weather tab labeled "forecast" is shown. Responsive to a user clicking on the tab 650, the presentation system will display the screen shown in FIG. 6E. This tab and view are defined by the code shown in FIG. 6D, beginning at line 652. The code in FIG. 6D illustrates another feature of the present invention, that of view replication using the data declaration.

With reference to line 652, it will be noted that the data path definition for each forecast, "forecast[1]/day", does not include a location step operator definition on the "day" element. As such, each instance of the "day" definition defined in the XML data source will be replicated and displayed as a new view. As shown in FIG. 5, five day definitions, 506, 508, 510, 512, and 514, are present weather.cgi. These generally correspond to "today," "tonight," "Tuesday," "Wednesday," "Thursday." Each defined "day" element thus generates an instance of the "weatherSummary class defined in line 610, resulting "forecast data" views rendered at 652A through 652E in FIG. 6E. It will be readily understood that this replication allows the data definintion to control the output of the presentation system view. In this case, the data generates a new view for each instance of the "day" element. For example, were only three days displayed under the forecast element, only three days would appear in the image window of FIG. 6E; likewise, were seven days provided in the forecast data, seven days would appear in the image data of FIG. 6E. Replication can become a powerful tool when used in conjunction with the source code as defined herein. Replication can be controlled with location declarations, e.g: [-7] up to and including the seventh; *[5-] from the fifth onwards; *[5-6] the fifth and sixth, etc.

While replication of a view is one example of the use of data replication, methods, classes and other elements of the source code can take advantage of this replication feature. Moreover, using operators on the declarations can also control the way data is read from the XML file.

While the above examples have concentrated on the data source as being in an XML syntax, other arbitrary data syntaxes and structures may be used in accordance with the present invention. A non-XML syntax for specifying the same mechanism might be, for example:

```
view {
  datapath="weather:/";
  children = [view {
    datapath="forecast/day";
    children=[text {datapath="label"}, image {datapath=
"imageurl"}, text {datapath="desc"}];
  ];
};
```

While yet another example might be:

```
view <- weather:/ {
  view <- forecast/day {
    text <- label;
    image <- imageurl;
    text <- desc}];
  ];
};
```

A JavaScript version of the above examples is as follows:

```
var v1 = new View(datapath="weather:/");
var v2 = new View(parent=v1, datapath="forecast/day");
new Text(parent=v2, datapath="label");
```

-continued

```
new Image(parent=v2, datapath="imageurl");
new Text(parent=v2, datapath="desc");
```

Hence, any method for creating the objects that are bound to the data source to create the views may be used in accordance with the present invention.

The use of the declarative statement for XML data provided to the presentation system of the present invention in conjunction with the constantly updating interface is a powerful tool for a developer seeking to provide rich content applications. For example, instead of requiring additional code to ensure that all elements of an application communicate with each other, the designer can provide a more simplified code and allow the code to simply update itself based on the change in the data. Whenever underlying data changes, the display automatically updates to reflect the changes.

Figures 7A, 7B:
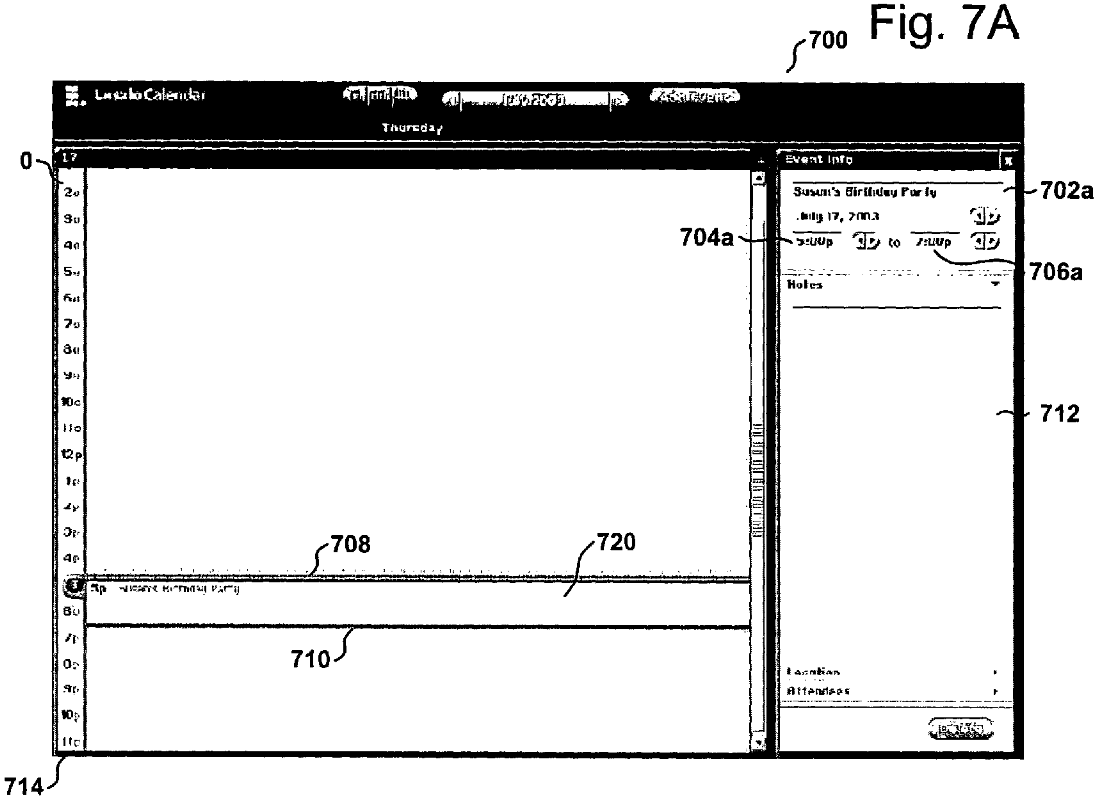
FIG. 7A is an exemplary view window of a calendar application generated using the source code of FIG. 8 and the data of FIG. 7B.
FIG. 7B is an exemplary XML data file listing for a calendar application provided by the presentation server according to one embodiment of the present invention.

An example of this can been seen with respect to FIGS. 7A through 7D. FIG. 7A shows a window of an exemplary calendar application. Those of average skill in the art will be familiar with a calendar window 700 which displays a day view in pane 720 and a detail view in pane 712. Pane 720 includes a time scale 714 along the left-hand side thereof. The display pane 714 shows an appointment with a first, start line 708 adjacent to the 5:00 p.m. portion of the scale and an end line 710 adjacent to the 7:00 p.m. portion of the scale. Lines 708 and 710 indicate the start and end time of the appointment and correspond to data displayed in an the detail view pane 712 at 704A and 706A, respectively. Note also that the descriptive text 702A of "Susan's birthday party" is displayed in window 720 in pane 720.

FIG. 7B shows the XML data from an exemplary in an XML data document stores the appointment data shown in window 700. The event XML shown in FIG. 7B includes summary data 702, start data 704, comment data 705 and end data 706. This data populates fields 702, 704, and 706A as well as the data in pane 720.

Figures 7C, 7D:
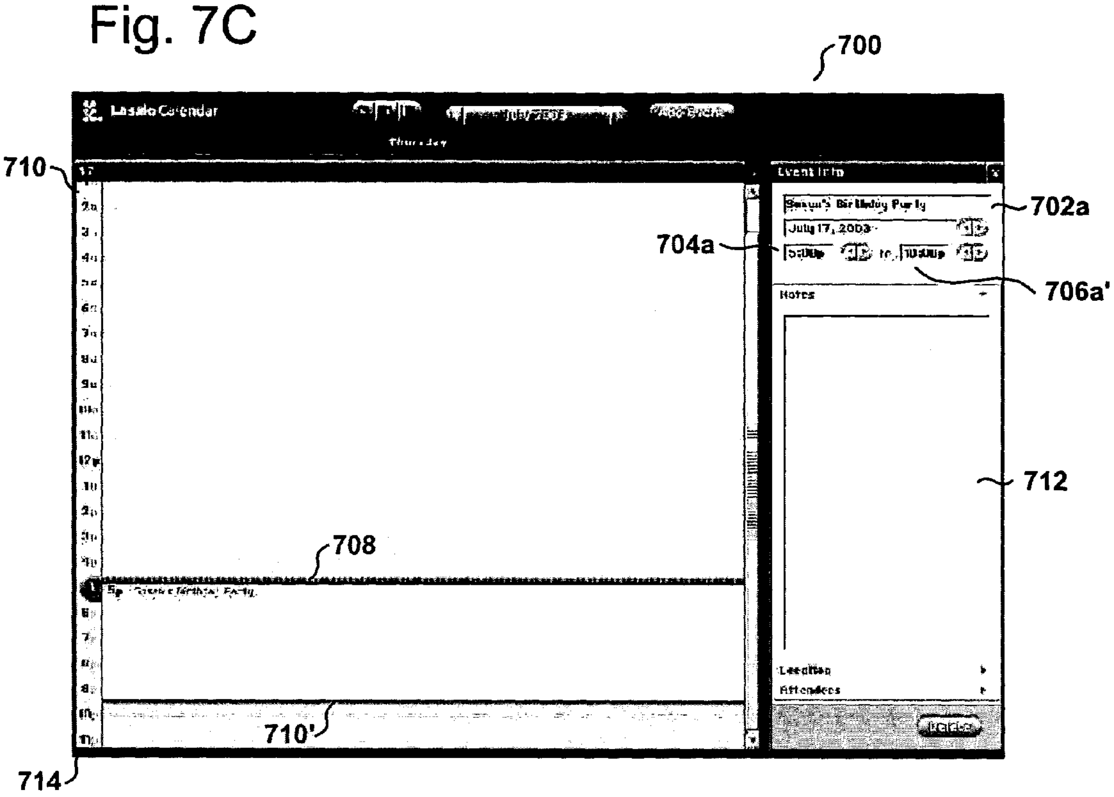
FIG. 7C is an exemplary view window of a calendar application generated using the source code of FIG. 8 and the data of FIG. 7D.
FIG. 7D is an exemplary XML data file listing for a calendar application provided by the presentation server according to one embodiment of the present invention.

FIGS. 7C and 7D illustrate what happens when a user changes the data in one of panes 710 or 712. Ideally, any update to the data by a user in one pane would be immediately reflected in the other pane. For this to occur, in a conventional approach, when a user to changes the data in pane 712, some code linking the application data pane 712 to the display pane 720 would be required to ensure that the panes update relative to one another.

In the present invention, simply updating the data at lines 702, 704, or 706 in the XML code will update the corresponding data in both of the panes. For example, suppose a user uses the radial buttons in FIG. 7C to change the time of the party's end from 7:00 p.m., as shown in FIG. 7A, to 10:00 p.m., as shown in FIG. 7C, at 706*a*'. This changes the underlying XML data at line 706' and the change is reflected in pane 720A where line 710' has moved to correspond to the vertical scale of time at 714, indicating it ends at 10:00 p.m. And vice-versa: dragging 708/710 causes a change in the data that is reflected in the display panel (712, 704*a*, 706*a*').

Based on the foregoing examples, it should be understood that the nature of the data binding system of the present invention allows multiple types of data to be specified in the source code. For example, background animations, icons, texts, and other illustrations can be linked to views, attributes, classes, and instances to provide a feature rich application and presentation to a user.

Yet another example of the use of the data binding method of the present invention is shown in FIGS. 8A, 8B and 8C. In this example, a contact application is shown. In FIG. 8B, contact data is shown in an exemplary window, including a contact name 825*a*, email 830*a*, home phone 835*a* and work phone 840*a* are shown. Ideally, any change to contact data should be updated concurrently with various parts of the contact presentation system. FIG. 8A shows an example of an XML document containing data which can be utilized to display the contact code shown in FIG. 8B.

One unique aspect of the present invention is the use of the bound data such that the display window shown in FIG. 8B only needs to generate contact display information for the limited number of names shown in window 810 of FIG. 8B. Normally, all contacts in the display are rendered and the new slider bar 820 merely allows a user to "scroll" through the rendered list. However, in the present case, the display is rendered "on the fly" so that instead of rendering every name in a user's phone book, the display system only needs to render, for example, ten names as the user activates scroll bar 820 on window 800.

FIG. 8C shows exemplary source code for implementing this feature. As shown in FIG. 8C, the data path declaration matches/replicates on every (*) node inside the resultset node on the "localdata" dataset as specified in line 822, with the display name, e-mail, and other variables specified in lines 825, 830, 835, and 840. The replication='lazy' attribute is what makes this datapath 'smart' in that is only replicates enough views to fill the window. Note that if the window is resized, an appropriate number of additional views will be created/replicated. The view height definition at 850 specifies a height of "20" and here limits the display area so that only those data rows necessary for display in the height area are actually displayed. In this case, a height of 20 will display ten rows of data with an intervening space. The data is defined by calling the text displayed at the variables listed in lines 825, 830, 835 and 840.

Hence, the invention provides a novel system for binding an arbitrary data hierarchy to an arbitrary display hierarchy. In a further unique aspect, these data structures are built at compile time and compiled into the program. The entities in these data structures correspond one for one with the types and properties of the created views. The view hierarchy can differ from the shape of the data structure because a view is bound to a data entity through an expression that refers to an arbitrary position or range within the source, while in prior art the views are created according to their position. In the present invention, the types of the views are specified in the view hierarchy specification, where in prior art there is only one data structure that specifies both the views and the data—nothing is merged. Finally, in the present invention, the created view contains a reference to the entity that it was created to represent.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method at least partially implemented on a computing device for providing data content from an arbitrarily defined data source for use with an application associated with a user interface, comprising the steps of:

providing an XML document containing said data content for display in the user interface, the XML document having a root definition declaring an external data source outside the XML document, the external data source responsible for providing the data content in the XML document, the XML document stored in a first processor readable storage device;

providing a mark-up language description of the application, wherein the mark-up language description of the application includes a dataset reference declaring a location of the XML document and a view element associated with the user interface defining a format for displaying the data content in the user interface, the view element containing a declaration statement associated with each instance of data content that will be displayed in the user interface, each declaration statement defines a data path to directly access the data content from the XML document via the dataset reference; and sequentially performing the steps of:

in response to receiving a request to view the user interface, responding to the request by retrieving the data content directly from the XML document via each declaration statement contained in the view element;

compiling said mark-up language description using the data content retrieved via the declaration statement in order to create executable code for a renderer associated with the user interface; and providing the executable code to the renderer, wherein the renderer displays the data content in the user interface according to the format specified in the view element, wherein the executable code maintains a live connection between each declaration to data statement associated with the user interface and the data content associated with each declaration to data statement such that any content that is updated within the XML document is automatically updated in the user interface.

2. The method of claim 1 wherein said step of retrieving the data content from the XML document is performed during said step of compiling.

3. The method of claim 2 wherein data structures in the XML document correspond with a type of a created view.

4. The method of claim 2 wherein data structures in the XML document correspond with a property of a created view.

5. The method of claim 1 wherein the method is performed on a server, and the method includes the additional step of transmitting said executable code to a client.

6. The method of claim 1 wherein the view element is bound to a data entity in the XML document through an expression that refers to an arbitrary position within the XML document.

7. The method of claim 1 wherein the view element is bound to a data entity in the XML document through an expression that refers to an arbitrary range within the XML document.

8. The method of claim 1 wherein the XML document includes a hierarchical data structure with at least one attribute declaration, and said attribute has at least two commonly named definitions.

9. The method of claim 8 wherein the attribute declaration includes a location step operator.

10. The method of claim 9 wherein the view element contains an expression to replicate each instance of said at least two commonly named definitions.

11. The method of claim 1 wherein the declaration statement includes a relative location path to the data content in the XML document.

12. The method of claim 1 wherein the declaration statement includes an absolute location path to the data content in the XML document.

13. The method of claim 1 wherein the data content is an image definition.

14. The method of claim 1 wherein the data source is a source universal resource locator.

15. The method of claim 1 wherein the data content is text.

16. The method of claim 1 wherein the data content is a movie.

17. The method of claim 1 further including the step of transmitting said executable code from a server to a client.

18. The method of claim 1 further comprising the steps of:

receiving a second request to view a second user interface associated with the application, wherein the application includes a second view element defining a format for displaying data content in the second user interface and contains a declaration statement defining the data content to retrieve form the XML document via the dataset reference;

accessing the data content from said XML document via the declaration statement contained in the second view element;

compiling said mark-up language description using the accessed data content to create executable code associated with the second user interface; and providing the executable code to the renderer.

19. The method of claim 1 further comprising:

receiving new data content;

updating the XML document with newly received data; and repeating said steps of retrieving, compiling, and providing.

20. The method of claim 19 wherein the new data content is received from a user.

21. The method of claim 19 wherein the new data content is received from the data source.

22. The method of claim 1 wherein the data source is identified by a data source universal resource locator.

23. One or more processor readable storage devices having processor readable code embodied on said processor readable storage devices, said processor readable code for programming one or more processors to perform a method for providing data content to an application responsible for generating each window in a user interface, the method comprising the steps of:

providing an XML document including at least a portion of the data content for display in each window of the user interface, the XML document having a definition declaring an external data source outside the XML document, the external data source responsible for providing the data content in the XML document;

providing a mark-up language description of said application, wherein the mark-up language includes a dataset reference that serves as a default root for each declaration to data statement contained in a view element in the application, the view element containing a declaration statement associated with each instance of data content that will be displayed in the user interface, each declaration statement defines a data path to directly access the data content from the XML document via the dataset reference, and wherein the application contains a view element associated with each window in the user interface that defines a format of the data content to be displayed in the window;

performing sequential steps of:

in response to receiving a request to view a particular window of the user interface, retrieving the data content directly from the XML document via the declaration to data statement contained in the view element associated with the particular window; and compiling said mark-up language description of said application using the data content accessed via each declaration to data statement to create executable code for a renderer that provides said data content to the renderer, providing the executable code to the renderer, wherein the renderer displays the data content in the particular window of the user interface according to the format specified in the view element;

wherein the executable code maintains a live connection between each declaration to data statement associated with the particular window and the data content associated with each declaration to data statement such that any content that is updated within the XML document is automatically updated in the particular window of the user interface.

24. One or more processor readable storage devices according to claim 23 wherein the method is performed on a server, and the method includes the additional step of transmitting said executable code to a client.

25. One or more processor readable storage devices according to claim 23 wherein the XML document includes a hierarchical structure including at least one root data path and at least one attribute, and has at least two commonly named definitions.

26. One or more processor readable storage devices according to claim 25 wherein the attribute declaration includes a location step operator.

27. One or more processor readable storage devices according to claim 25 wherein the attribute declaration excludes a location step operator.

28. One or more processor readable storage devices according to claim 23 wherein the language includes a view and the view is replicated for said at least two commonly named definitions.

29. One or more processor readable storage devices according to claim 28 wherein the declaration statement is a relative location path.

30. One or more processor readable storage devices according to claim 28 wherein the declaration statement includes an absolute location path.

31. One or more processor readable storage devices according to claim 23, further comprising the steps of:

receiving a second request to view a second user interface associated with the application, wherein the application includes a second view element defining a format for displaying data content in the second user interface and contains a declaration statement defining the data content to retrieve form the XML document via the dataset reference;

accessing the data content from said XML document via the declaration statement contained in the second view element;

compiling said mark-up language description using the accessed data content to create executable code associated with the second user interface; and providing the executable code to the renderer.

32. One or more processor readable storage devices according to claim 23 further comprising:

receiving new data content;

updating the XML document with the newly received data; and repeating said steps of retrieving, compiling, and providing.

33. One or more processor readable storage devices according to claim 32 wherein the modification is performed by a user.

34. An apparatus processing instructions to provide data content to a user interface, comprising:

one or more storage devices; and one or more processors in communication with said one or more storage devices, said one or more processors performing a method comprising the steps of:

accessing a declaration statement contained in a view element of a mark-up language description of an application associated with the user interface, wherein the declaration statement refers to a dataset reference within the mark-up language description of the application indicating a location of an XML document containing data content and defines a data path for retrieving the data content from the XML document, the view element associated with the user interface and defining a format for displaying the data content in the user interface, the view element containing a declaration statement associated with each instance of data content that will be displayed in the user interface, each declaration statement defines a data path to directly access the data content from the XML document via the dataset reference;

wherein the document contains said data content for display in the user interface, the XML document having a root definition declaring an external data source outside the XML document, the external data source responsible for providing the data content in the XML document, the XML document stored in a first processor readable storage device; and sequentially:

in response to receiving a request to view the user interface, retrieving said data content directly from said XML document via the data path defined by the declaration statement contained in the view element;

compiling said mark-up language description of said application associated with the user interface using the data content retrieved from the XML document to create executable code for a renderer that provides said data content to the user interface, said step of compiling is performed at a server in response to said request; and providing the executable code to the renderer, wherein the renderer displays the data content in the user interface according to the format specified in the view element;

wherein the executable code maintains a live connection between each declaration to data statement associated with the user interface and the data content associated with each declaration to data statement such that any content that is updated within the XML document is automatically updated in the user interface.

35. The apparatus of claim 34 wherein the apparatus is on a server, and the method includes the additional step of transmitting said executable code to a client, the client including said renderer.

36. The apparatus of claim 35 further including the step of receiving a request for particular content, said request is received at the apparatus and said step of compiling is performed at said apparatus in response to said request.

37. The apparatus of claim 36 further including the step of transmitting said executable code from said apparatus to a client.

38. The apparatus of claim 34, further comprising the steps of:

receiving a second request to view a second user interface associated with the application, wherein the application includes a second view element defining a format for displaying data content in the second user interface and contains a declaration statement defining the data content to retrieve form the XML document via the dataset reference;

accessing the data content from said XML document via the declaration statement contained in the second view element;

compiling said mark-up language description using the accessed data content to create executable code associated with the second user interface; and providing the executable code to the renderer.

39. The apparatus of claim 34 further comprising:

receiving new data content;

updating the XML document with the newly received data; and repeating said steps of retrieving, compiling, and providing.

40. A method of providing a rich Internet application, comprising:

receiving a request for data content, said request is received at a server;

sequentially performing the steps of:

in response to receiving the request, accessing a code description of the Internet application, the code description including a dataset reference indicating a location of an XML document containing data content and a view element defining a format for displaying the data content in a user interface, the view element containing at least one declaration statement defining the data content to retrieve from said XML document via the dataset reference;

retrieving the data content defined in the view element directly from the XML document via the dataset reference, the XML document containing said data content for display in the user interface, the XML document having a root definition declaring an external data source outside the XML document, the external data source responsible for providing the data content in the XML document, the XML document stored in a first processor readable storage device;

compiling said code description of the Internet application using the retrieved data content to create executable code for a renderer, said step of compiling is performed at said server in response to said request; and transmitting said executable code from said server to a client, the client including a renderer which displays the data content in the user interface according to the format specified in the view element;

wherein the executable code maintains a connection between each declaration to data statement associated with the user interface and the data content associated with each declaration to data statement such that any content that is updated within the XML document is automatically updated in the user interface.

41. One or more processor readable storage devices according to claim 32 wherein the modification is performed by a data supplier.

* * * * *